United States Patent
Reddy et al.

(10) Patent No.: US 11,150,693 B2
(45) Date of Patent: Oct. 19, 2021

(54) ADAPTABLE RADIO FREQUENCY SYSTEMS AND METHODS

(71) Applicant: APPLE INC., Cupertino, CA (US)

(72) Inventors: Vusthla Sunil Reddy, San Jose, CA (US); XinPing Zeng, Santa Clara, CA (US); Peter M. Agboh, San Francisco, CA (US); Mohit Narang, San Jose, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 918 days.

(21) Appl. No.: 14/641,135

(22) Filed: Mar. 6, 2015

(65) Prior Publication Data
US 2016/0262028 A1    Sep. 8, 2016

(51) Int. Cl.
*G06F 1/16* (2006.01)

(52) U.S. Cl.
CPC ............ *G06F 1/163* (2013.01); *G06F 1/1698* (2013.01); *G06F 1/1656* (2013.01)

(58) Field of Classification Search
CPC ....................................................... G06F 1/163
See application file for complete search history.

(56) References Cited

U.S. PATENT DOCUMENTS

| | | | |
|---|---|---|---|
| 6,012,105 A * | 1/2000 | Rubbmark | H04B 1/3877 710/14 |
| 6,477,117 B1 * | 11/2002 | Narayanaswami | G04G 13/026 368/224 |
| 8,442,437 B1 | 5/2013 | Beard et al. | |
| 8,738,103 B2 | 5/2014 | Puente Bailarda et al. | |
| 8,786,440 B2 | 7/2014 | Clare et al. | |
| 2003/0228891 A1 * | 12/2003 | Kobayashi | H01Q 1/242 455/575.5 |
| 2004/0242289 A1 * | 12/2004 | Jellicoe | H04B 1/18 455/575.1 |
| 2005/0009579 A1 * | 1/2005 | Chen | H04W 88/02 455/575.1 |
| 2009/0040022 A1 * | 2/2009 | Finkenzeller | G06K 7/0008 340/10.1 |
| 2012/0230299 A1 | 9/2012 | Shu et al. | |
| 2015/0172426 A1 * | 6/2015 | Asrani | H04B 1/40 455/77 |

* cited by examiner

*Primary Examiner* — Hsinchun Liao
(74) *Attorney, Agent, or Firm* — Fletcher Yoder, P.C.

(57) ABSTRACT

Systems and method for improving performance of a radio frequency system are provided. One embodiment describes a radio frequency system, which may be modified based upon a detected housing and/or accessory of an electronic device. The modifications may counteract impacts of the housings and/or accessories on the radio frequency transmission.

13 Claims, 7 Drawing Sheets

ADAPTABLE RADIO FREQUENCY SYSTEMS AND METHODS

BACKGROUND

The present disclosure relates generally to radio frequency systems and, more particularly, to adaptation of radio frequency system configuration settings based upon electronic device housing and/or accessories.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices may include a radio frequency system to facilitate wireless communication of data with other electronic devices and/or a network. The radio frequency system may include a transceiver that receives a digital representation of data as a digital electrical signal and generates an analog representation of the data as an analog electrical signal. A power amplifier may then amplify the analog electrical signal to a desired output power for wireless transmittance via an antenna at a desired radio frequency, such as an assigned resource block or channel. As used herein, a "channel" is intended to describe a range of frequencies and a "resource block" is intended to describe a range of frequencies within the channel.

Electronic devices are becoming increasingly customizable. For example, these electronic devices may utilize any number of customizable housings and/or accessories that may have an impact on the electronic devices' radio frequency performance. For example, an electronic device, such as a smart watch or tablet computer may include a customizable housing material, such as: gold, stainless steel, aluminum, ceramic, and/or plastic. Further, these electronic devices may be coupled to accessories that may impact radio frequency transmission and/or reception. For example, a watch may include interchangeable band that have varying characteristics, such as varied densities (e.g., mesh bands vs. link bands), shapes (e.g., slim vs. thick bands), materials (e.g., leather, rubber, and/or metal), etc. Similarly, a tablet computer may work with a cover, case, and/or other accessories having varying characteristics that may impact radio frequency transmission and/or reception.

Unfortunately, these frequency transmission and/or reception variations may result in an undesirable varied user experience. In some scenarios, the varied characteristics of the electronic device housings and/or electronic device accessories may result in reduced inter-operability with radio frequency communications systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving performance of a radio frequency system by adapting operation of the electronic devices' radio frequency system based at least in part on characteristics of the electronic devices' housings and/or characteristics. Generally, the radio frequency system may wirelessly communicate data with other electronic devices and/or a network by modulating radio waves at a desired transmission frequency based on an analog representation of the data (e.g., an analog electrical signal). However, the analog electrical signal may contain noise or other undesirable traits introduced by the electronic device housing and/or accessories.

Accordingly, the techniques described herein may improve operation of the radio frequency system by enabling dynamic radio frequency transmission and/or reception control based at least in part on one or more characteristics of an electronic device housing and/or accessory. In some embodiments, one or more settings of the radio frequency system may be altered based upon one or more housings and/or accessories of the electronic device. More specifically, in some embodiments, the electronic device may determine one or more characteristics of a housing of the electronic device (e.g., size, shape, and/or material) and/or one or more characteristics of one or more accessories of the electronic device. Thus, dynamic radio frequency system settings may be applied for particular characteristics of an electronic device and/or electronic device accessories.

In this manner, the radio frequency system may specifically transmit and/or receive radio frequency signals based upon particular characteristics of the electronic device and/or electronic device accessories. For example, in some embodiments, the radio frequency system may adjust an amplification, frequency, phase, modulation, etc. to provide relatively uniform radio frequency transmission and/or reception, despite varied characteristics of electronic device housings and/or accessories.

BRIEF DESCRIPTION OF THE DRAWINGS

Various aspects of this disclosure may be better understood upon reading the following detailed description and upon reference to the drawings in which.

DETAILED DESCRIPTION

Figure 1:
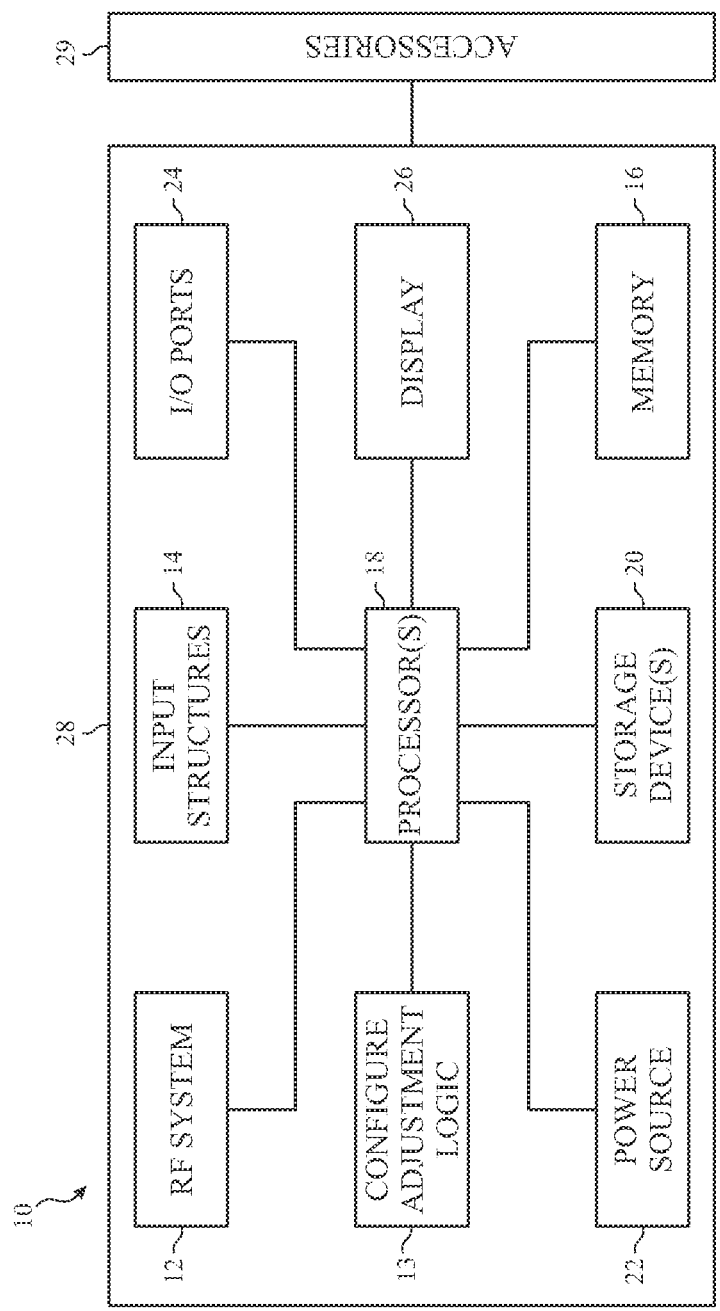
FIG. 1 is a block diagram of a electronic device with an adaptable radio frequency system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may include a radio frequency system to facilitate wirelessly communicating data with another electronic device and/or a network. More specifically, the radio frequency system may modulate radio waves at a desired radio frequency, such as an assigned one or more resource block or channel, to enable the electronic device to communicate via a personal area network (e.g., Bluetooth network), a local area network (e.g., an 802.11x Wi-Fi network), and/or a wide area network (e.g., a 4G or LTE cellular network). In other words, the radio frequency systems may utilize various wireless communication protocols to facilitate communication of data.

Nevertheless, radio frequency systems may generally be operationally similar regardless of the wireless communication protocol used. For example, to transmit data, processing circuitry may generate a digital representation of the data as a digital electrical signal and a transceiver (e.g., a transmitter and/or a receiver) may then convert the digital electrical signal into one or more analog electrical signals. The analog electrical signal may then be amplified by a power amplifier, filtered by one or more filters, and transmitted by an antenna.

However, the radio frequency system transmission and/or reception may be impacted by the electronic device housing and/or proximate electronic device accessories. In some situations, when the radio frequency system is not adjusted to counteract this impact, the characteristics of the housings and/or proximate accessories may result in distorted or other undesirable radio frequency communication traits.

For example, in some instances, characteristics of the housings and/or accessories may result in reduced signal strength (e.g., by impacting the amplitude, frequency, phase, etc. of the radio frequency signals).

Accordingly, as will be described in more detail below, performance of the radio frequency system may be improved by dynamically controlling operational parameters of the radio frequency system based at least in part on the housings and/or proximate accessories. In some embodiments, the electronic device may determine one or more attributes of the housings and/or accessories and modify the operational parameters to facilitate communications by the radio frequency system with minimal impact by the housings and/or accessories.

In other words, the techniques improve performance of a radio frequency system by dynamically adjusting the operational parameters of the radio frequency system based on attributes of the electronic device's housing and/or proximate accessories. To help illustrate, an electronic device 10 that may utilize a radio frequency system 12 is described in FIG. 1. As will be described in more detail below, the electronic device 10 may be any suitable electronic device, such as a handheld computing device, a tablet computing device, a notebook computer, smart watch, and the like.

Accordingly, as depicted, the electronic device 10 includes the radio frequency system 12, configuration adjustment logic 13, input structures 14, memory 16, one or more processor(s) 18, one or more storage devices 20, a power source 22, input/output ports 24, and an electronic display 26. The various components described in FIG. 1 may include hardware elements (including circuitry), software elements (including instructions stored on a non-transitory computer-readable medium), or a combination of both hardware and software elements. It should be noted that FIG. 1 is merely one example of a particular implementation and is intended to illustrate the types of components that may be present in the electronic device 10. Additionally, it should be noted that the various depicted components may be combined into fewer components or separated into additional components. For example, the memory 16 and a storage device 20 may be included in a single component.

As depicted, the processor 18 is operably coupled with memory 16 and the storage device 20. More specifically, the processor 18 may execute instruction stored in memory 16 and/or the storage device 20 to perform operations in the electronic device 10, such as instructing the radio frequency system 12 to communicate with another device. As such, the processor 18 may include one or more general purpose microprocessors, one or more application specific processors (ASICs), one or more field programmable logic arrays (FPGAs), or any combination thereof. Additionally, memory 16 and/or the storage device 20 may be a tangible, non-transitory, computer-readable medium that stores instructions executable by and data to be processed by the processor 18. For example, the memory 16 may include random access memory (RAM) and the storage device 20 may include read only memory (ROM), rewritable flash memory, hard drives, optical discs, and the like.

Additionally, as depicted, the processor 18 is operably coupled to the power source 22, which provides power to the various components in the electronic device 10. As such, the power source 22 may includes any suitable source of energy, such as a rechargeable lithium polymer (Li-poly) battery and/or an alternating current (AC) power converter. Furthermore, as depicted, the processor 18 is operably coupled with I/O ports 24, which may enable the electronic device 10 to interface with various other electronic devices, and input structures 14, which may enable a user to interact with the electronic device 10. Accordingly, the inputs structures 14 may include buttons, keyboards, mice, trackpads, and the like. Additionally, in some embodiments, the electronic display 26 may include touch sensitive components.

In addition to enabling user inputs, the electronic display 26 may display image frames, such as a graphical user interface (GUI) for an operating system, an application interface, a still image, or video content. As depicted, the display is operably coupled to the processor 18. Accordingly, the image frames displayed by the electronic display 26 may be based on display image data received from the processor 18.

As depicted, the processor 18 is also operably coupled with the radio frequency system 12, which may facilitate communicatively coupling the electronic device 10 to one or more other electronic devices and/or networks. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. As can be appreciated, the radio frequency system 12 may enable communication using various communication protocols. In one embodiment, the electronic device 10 may facilitate payment transactions (e.g., transactions conforming to Europay, MasterCard and Visa (EMVCo) standards) using the radio frequency system 12.

Operational principles of the radio frequency system 12 may be similar for each of the communication protocols (e.g., Bluetooth, LTE, 802.11x Wi-Fi, etc). More specifically, as will be described in more detail below, the radio frequency system 12 may convert a digital electrical signal containing data desired to be transmitted into an analog electrical signal using a transceiver. The analog electrical signal may then be amplified using a power amplifier, filtered using a filter, and transmitted using an antenna. In some embodiments, the configuration adjustment logic 13 may be polled to determine particular settings to apply to the radio frequency system 12. For example, the configuration adjustment logic 13 may include a lookup table (LUT) having radio frequency system 12 configuration settings associated with a variety of housings, accessories, and/or housing and/or accessory characteristics. Thus, proper configuration settings correlating to the current housing and/or proximate accessories may be derived from the configuration adjustment logic 13 and provided to the radio frequency system 12.

Figure 2:
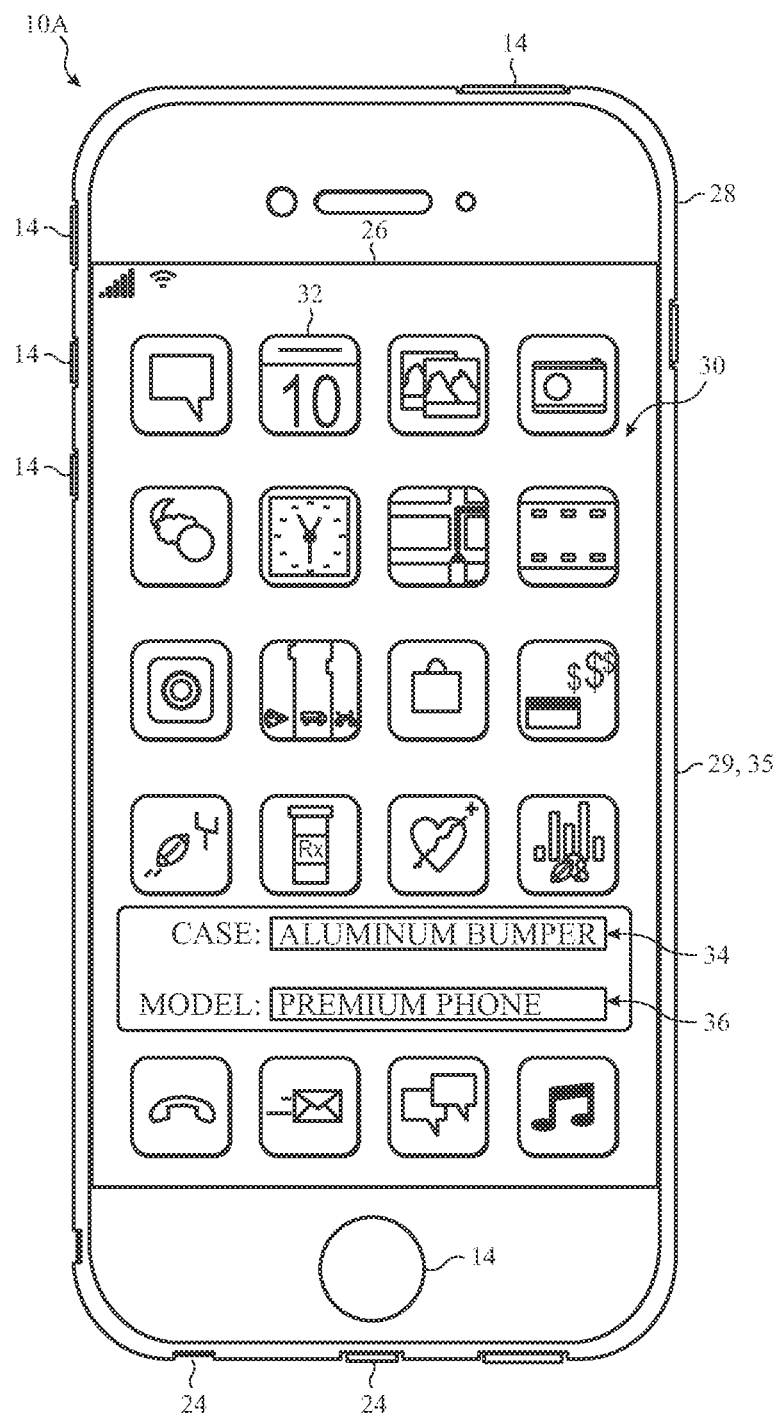
FIG. 2 is an example of the electronic device of FIG. 1, in accordance with an embodiment.

As described above, the electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an housing 28, which may protect interior components from physical damage and to shield them from electromagnetic interference. Further, as depicted in FIG. 2, one or more accessories (e.g., a case, cover, and/or protective bumper) may be added to the electronic device 10A. The housing 28 may surround the electronic display 26, which, in the depicted embodiment, displays a graphical user interface (GUI) 30 having an array of icons 32. By way of example, when an icon 32 is selected either by an input structure 14 or a touch sensing component of the electronic display 26, an application program may launch.

Additionally, as depicted, input structures 14 may open through the housing 28 (e.g., an enclosure). As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 24 open through the housing 28. In some embodiments, the I/O ports 24 may include, for example, an audio jack to connect to external devices. Additionally, the radio frequency system 12 may also be enclosed within the housing 28 and internal to the handheld device 10A.

As will be discussed in more detail herein, the housing, accessories, and/or attributes of the housing and/or accessories may be discerned by the electronic device 10 (e.g., smart phone 10A) to determine particular settings to apply to the radio frequency system 12. In the current embodiment, the electronic device 10 presents a user prompt 34 for manual entry of an accessory model and/or characteristic. For example, the currently selected option indicates that there is an aluminum protective bumper 35 installed on the smart phone 10A. Further, the GUI 30 may include static indications 36 of particular models and/or characteristics of the electronic device 10, the housing 28, and/or the accessories 29, which may be sourced from the electronic device 10 without user intervention (e.g., sourced from firmware and/or a system configuration file of the electronic device 10). For example, in the current embodiment, the smart phone 10A is the "premium phone" model, which may include a metal housing. Accordingly, based upon an identification of the particular electronic device 10, certain characteristics or attributes of the electronic device 10 housing 28 may be discerned.

Information obtained via the user prompt 34 and/or the static indications 36 indications may be used to poll for proper settings from the configuration adjustment logic 13 (FIG. 1) to be implemented on the radio frequency system 12. Thus, radio frequency system 12 communications may be dynamically customized for a particular housing 28 and/or accessories of the electronic device 10.

Figure 3:
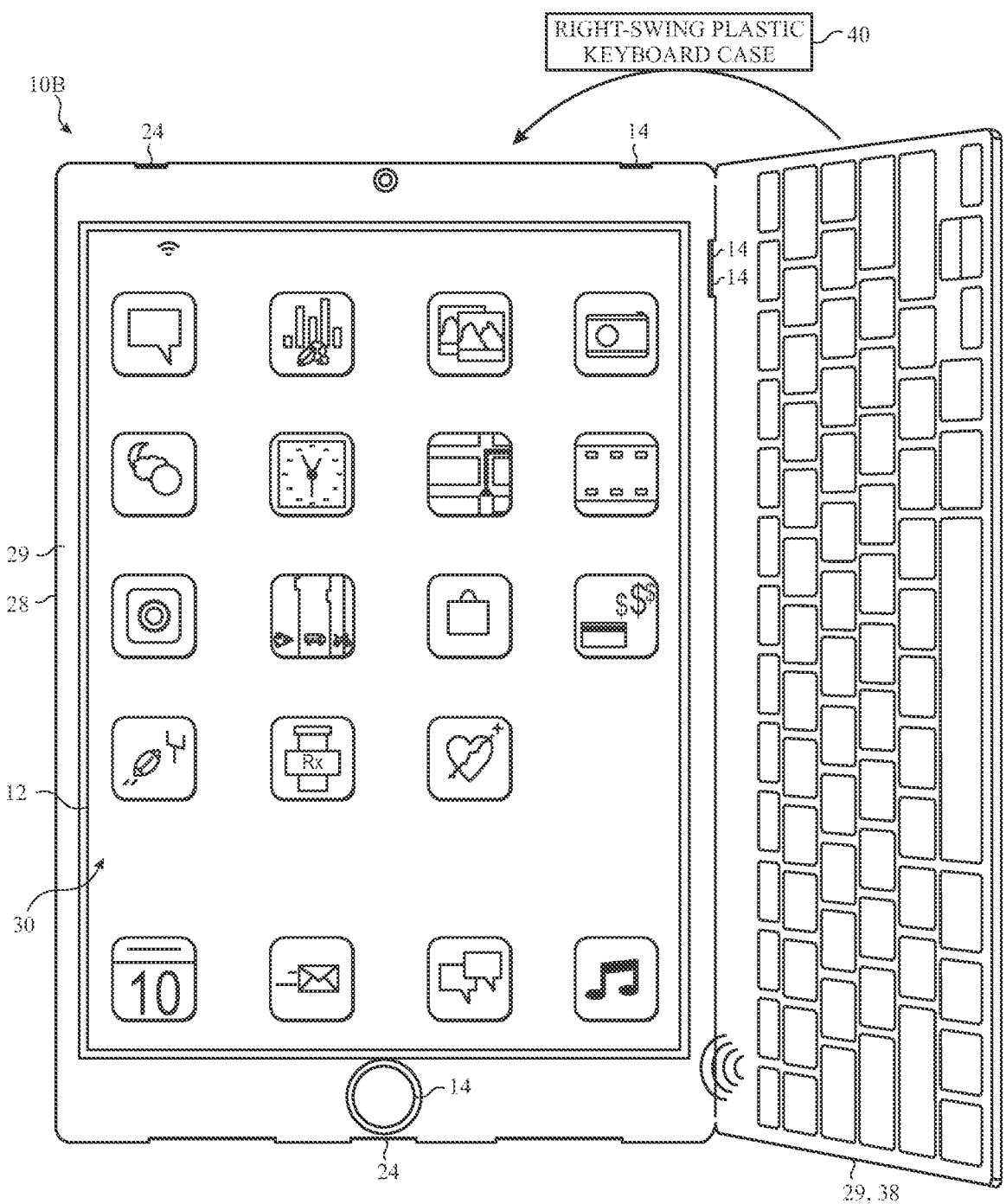
FIG. 3 is an example of the electronic device of FIG. 1, in accordance with an embodiment.

To further illustrate a suitable electronic device 10, a tablet device 10B is described in FIG. 3, such as any iPad® model available from Apple Inc. Additionally, in other embodiments, the electronic device 10 may take the form of a computer 10C as described in FIG. 4, such as any Macbook® or iMac® model available from Apple Inc. As depicted, the tablet device 10B and the computer 10C also include an electronic display 26, input structures 14, I/O ports 24, and an housing 28. Similar to the handheld device 10A, the radio frequency system 12 may also be enclosed within the housing 28 and internal to the tablet device 10B and/or the computer 10C.

In the embodiment of FIG. 3, an accessory 29 (e.g., a plastic keyboard case 38) is installed on the electronic device 10 (e.g., the tablet 10B). During the pairing process or other communications of the keyboard 38 with the electronic device 10, additional information 40 may be provided, such as the keyboard 38 model number, material types, orientation configuration (e.g., here, right-swing keyboard), etc. This information 40 may be used to poll the configuration adjustment logic 13 (FIG. 1) for proper settings for the radio frequency system 12 that correlate with the use of the keyboard 38. Thus, the impact of the keyboard 38 on the radio frequency system 12 communications may be reduced.

Figure 4:
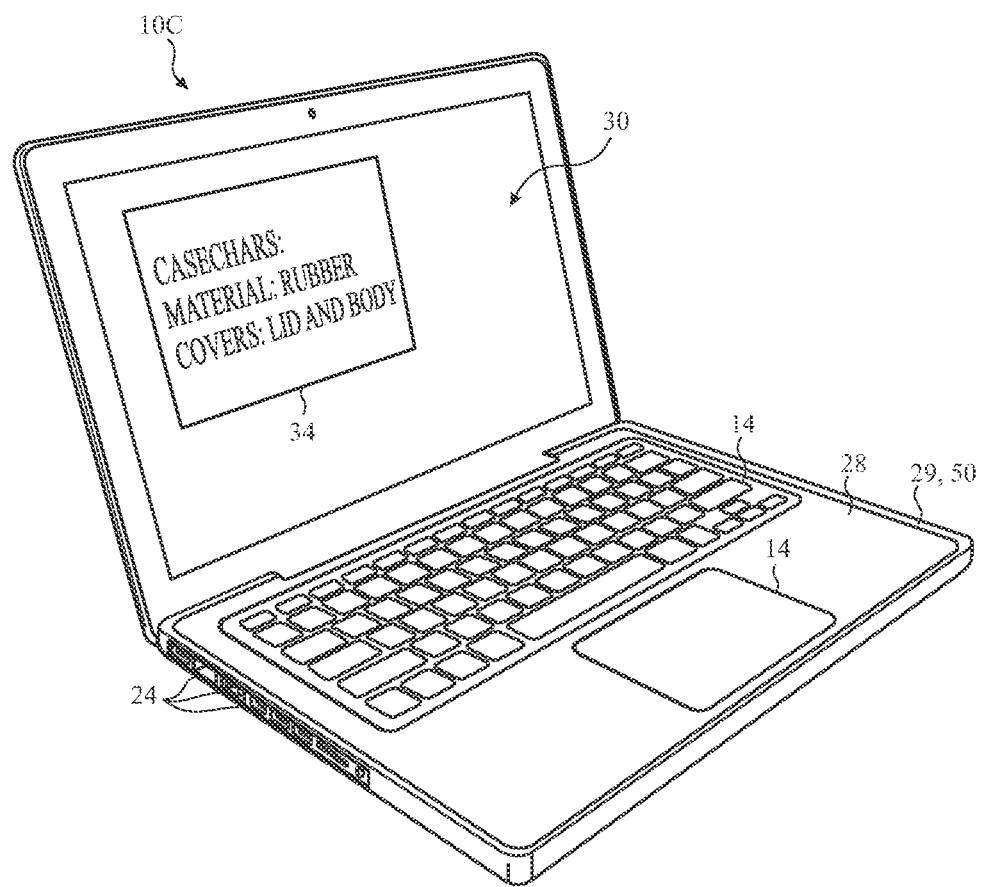
FIG. 4 is an example of the electronic device of FIG. 1, in accordance with an embodiment.

Additionally or alternatively the embodiment of FIG. 4, similar to the embodiment of FIG. 2, includes a GUI 30 that provides user prompts 34 for user provision of accessories 29 (e.g., a laptop cover 50). For example, in the embodiment of FIG. 4, the prompts 34 allow a user to specify the material type of the accessory 29 and/or the portions of the electronic device 10C that are covered by the accessory 29. As discussed above, the attributes of the housing 28, the accessories 29, and/or an identification of the housing 28 (e.g., provided by a model number of the electronic device 10C) and/or the accessories 29 may be used to modify communications settings of the radio frequency system 12.

Figure 5:
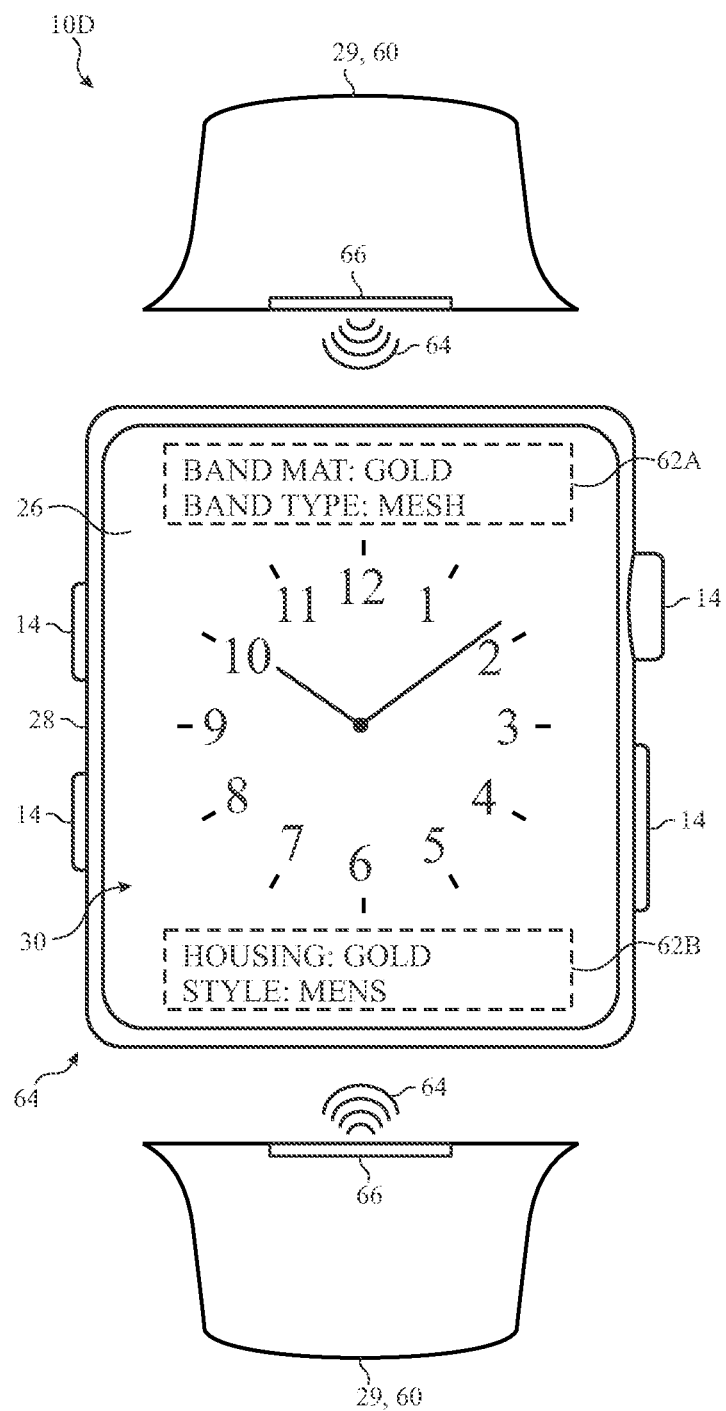
FIG. 5 is an example of the electronic device of FIG. 1, in accordance with an embodiment.

FIG. 5 illustrates an alternative electronic device 10 in the form of a smart watch 10D. As described above, operation of the radio frequency system 12 may be altered (e.g., by modifying operational parameters of the radio frequency system 12) based upon the particular housing 28 and/or accessories 29 of the smart watch 10D. For example, operational parameters of the radio frequency system 12 may be impacted based upon the housing 28 material (e.g., gold, stainless steel, aluminum, ceramic, etc.) and/or the accessory (e.g. wrist band 60) characteristics, such as: material type, shape, density, size, etc.

One or more data stores 62 (e.g., 62A and 62B in the current embodiment, which may be non-volatile memory, firmware, etc.) may store identifying information regarding the attributes of the housing 28 and/or accessories 29. For example, in the current embodiment, a first data store 62A may indicate attributes of the accessories 29 (e.g., the watch bands 60), while a second data store 62B may indicate attributes of a body 64 of the smart watch 10D. For example, in the current embodiment, the data store 62A indicates that the band 60 material is gold and that the band style or type is mesh. The data store 62B indicates that the housing 28 material is gold and the body style is a men's watch. Any number of attributes regarding the smart device 10 (e.g., the smart watch body 64) and/or the accessories 29 (e.g., the bands 60) may be stored and/or used to modify operational parameters of the radio frequency system 12.

In some embodiments, the attribute information regarding the accessories may be sourced from the accessories themselves. For example, in the current embodiment, the information relating to the bands 60 may be sourced from data transmitted 64 from the bands 60. For example, a data transfer mechanism 66 in the bands 60 may provide an indication of attributes of the bands 60, such as: identification information, materials, sizes, shapes, styles, etc. The data transfer mechanism 66 may be a radio frequency transmission system or any other mechanism capable of transferring characteristics of the bands 60 to the body 64.

Figure 6:
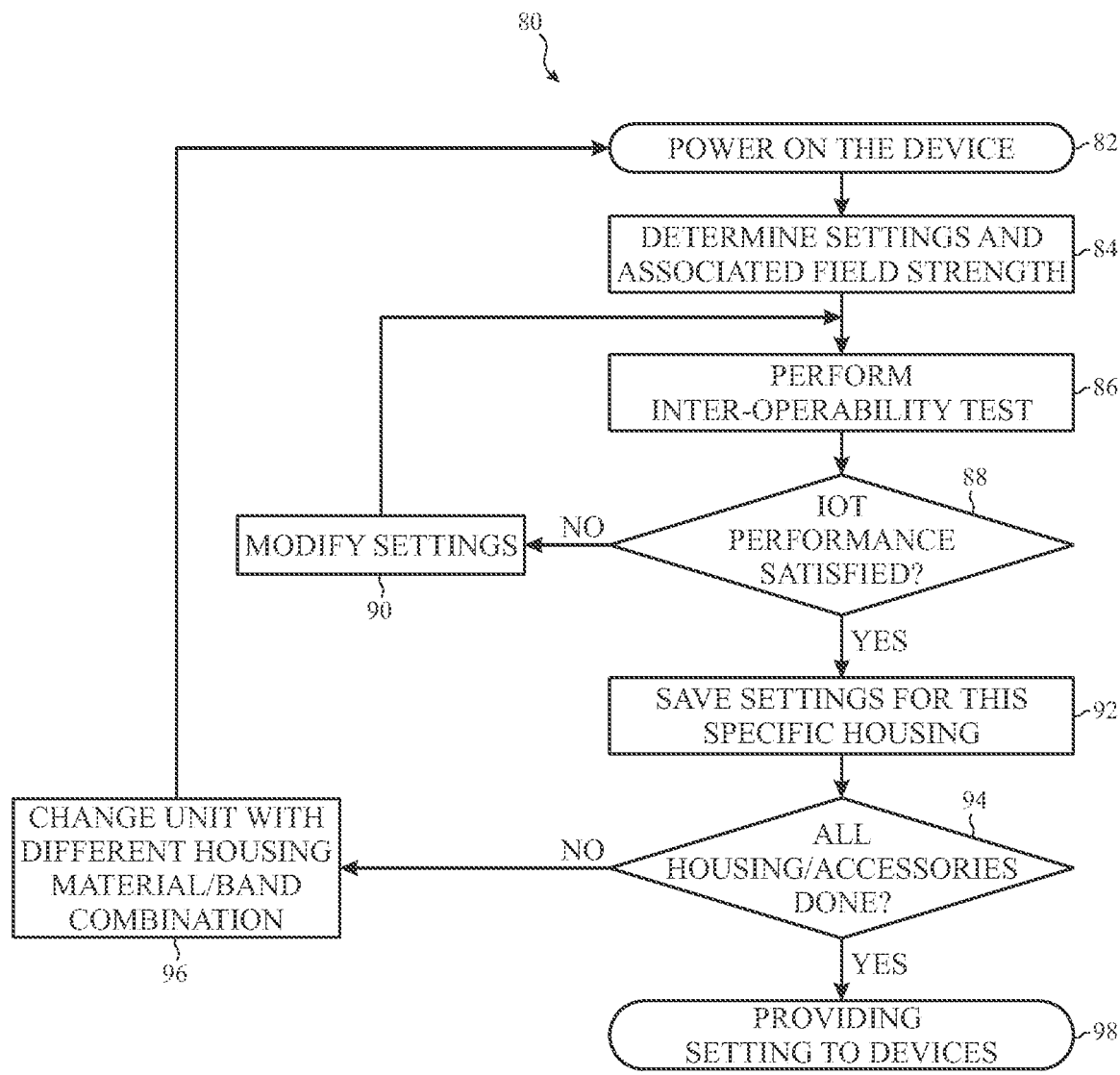
FIG. 6 is a flow diagram describing a process for determining dynamic settings for the radio frequency system based upon the housing and/or accessories of the electronic device, in accordance with an embodiment.

To determine proper radio frequency system 12 operational parameters for particular housings 28 and/or accessories 29, it may be beneficial to understand the impact that these housings 28 and/or accessories 29 have on the radio frequency system 12. FIG. 6 is a flow diagram describing a process 80 for determining dynamic settings for the radio frequency system based upon the housing and/or accessories of the electronic device, in accordance with an embodiment. For example, the output of process 80 may be stored as reference data (e.g., a lookup table) for the configuration adjustment logic 13.

The process 80 begins by powering on the electronic device 10 (block 82). Next, the current radio frequency system 12 settings are determined and a field strength associated with the current settings is measured (block 84).

An interoperability test is performed on the electronic device 10's radio frequency system 12, to determine whether or not sufficient communications with another radio frequency system meets sufficiency standards (block 86). For example, when testing EMV payment transactions, simulated payment transactions may be performed between the electronic device 10 and a payment system. The signal strength, successful transmission ratio, transmission rate, etc. may be measured during this interoperability test.

Based upon the results of the interoperability test, a determination is made as to whether or not a target performance has been achieved regarding tested transactions (decision block 88). For example, the target performance metrics may relate to the signal strength, successful transmission ratio, transmission rate, etc. of the transactions of the interoperability tests.

If the interoperability test results suggest that the target performance has not been achieved, radio frequency settings are modified (block 90) to fine-tune the radio frequency communications of the radio frequency system 12. For example, the accessories 29 and/or housings 28 may affect transmission power and/or phase of the radio frequency system 12. Accordingly, the phase may be adjusted to maximize and/or optimize the transmission power of the system 12. For example, some radio frequency readers utilize I channel (cosine wave) communications, while others use Q channel (sine wave) communications, adding a 90 degree phase to the signal. The housing 28 and/or accessory 29 characteristics may alter cosine and/or sine waves, such that the power distribution is incorrect. Thus, based upon the identity and/or attributes of the housing 28 and/or accessories 29, the phase can be adjust to counter-act unintended consequences caused by the housing 28 and/or accessories 29 (e.g., by adding 15 degrees to the phase). For example, when the housing 28 and/or accessories 29 are metal, there may be less change than plastic and/or leather housings 28 and/or accessories 29. Further, the modifications may change based upon a particular type of metal (e.g., stainless steel, aluminum, vs. gold).

Additionally, the automatic power control (APC) may be adjusted based upon the housing 28 and/or accessories 29. The goal of the APC may be to reduce saturation of a radio frequency reader, by supplying a properly powered signal to the radio frequency reader. Supplying an over-powered signal may saturate the reader, resulting in reduced transmission quality. As may be appreciated, conductive properties of housings 28 and/or accessories 29 made of metal may result in detuning of the transmission antennae when compared to housings 28 and/or accessories 29 made of less conductive materials (e.g., leather or plastic). Accordingly, the power level may be increased when housings 28 and/or accessories 29 that include metal or other conductive materials are present. When housings 29 and/or accessories 29 made of less conductive materials are present, the power level may be reduced.

Additionally, the frame delay time may be modified based upon the housing 28 and/or accessories 29. When a reader provides a command to the electronic device 10, the electronic device 10 may abide by a standard dictating that a reply occur within a strict reply window (e.g. 400 nanoseconds). If the reply is outside of this window, the transaction may fail. Certain housings 28 and/or accessories 29 may change the waveform shape of the transmitted signal, affecting a change in the reply time. Accordingly, settings related to a frame transmission delay time may be set to send a signal either earlier or later than normal, to counteract any unintended timing issues caused by the housings 28 and/or accessories 29. Further, load modulation amplitude settings may be modified based upon the housings 28 and/or accessories 29, which may provide different amounts of transmitted power from the device to the reader, to counteract unintended issues caused by the housings 28 and/or accessories 29.

Once the settings are modified, the interoperability test is re-run (block 86). This process continues until the modified operational parameters result in meeting the target performance of the interoperability test.

Upon satisfying the target performance, the settings are stored and associated with the housing 28, the accessories 29, and/or the combination of the housing 28 and the accessories 29 (block 92). For example, in some embodiments, these associations are stored in a lookup table or a database table that is stored on a tangible, non-transitory, machine-readable medium.

A determination is then made as to whether or not each of the housings 28 and/or accessories 29 have been tested (decision block 94). If there are other housings 28 and/or accessories 29 to test, the electronic device 10 housing 28 and/or accessories 29 are changed to form an untested housing 28, accessory 29, and/or combination of housing 28 and accessory 29 (block 96). The modified electronic device 10 is then put through the process 90, starting once again with block 82.

Once all of the desired housings 28, accessories 29, and/or housing 28 and accessory 29 combinations are complete, the reference data is complete and may be provided for incorporation in the electronic devices (block 98). For example, the reference data may be stored as the configuration adjustment logic 13 (FIG. 1), which may be stored in the firmware and/or a file (e.g., system configuration file) of the electronic device 10 and/or other data storage 20 of the electronic device 10.

Figure 7:
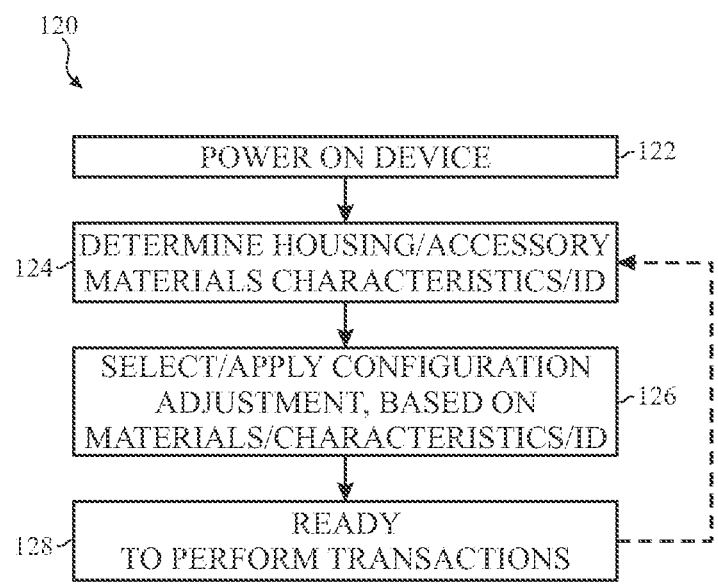
FIG. 7 is a flow diagram describing a process for dynamically configuring the radio frequency system based upon housing and/or accessories of the electronic device, in accordance with an embodiment.

Once the reference data is stored on the electronic device 10, the data may be accessed to obtain particular radio frequency system 12 settings for a particular housings 28, accessories 29, or housings 28 and accessory 29 combinations. FIG. 7 is a flow diagram describing a process 120 for dynamically configuring the radio frequency system 12 based upon housings 28 and/or accessories 29 of the electronic device 10, in accordance with an embodiment.

The process 120 begins with powering on the electronic device 10 (block 122). Once powered-on, a determination is made as to the particular housings 28, accessories 29, and/or housing 28 and/or accessory 29 characteristics that are currently present with the electronic device 10 (block 124). For example, firmware and/or a file (e.g., system configuration file) of the electronic device may indicate the particular housing 28 and/or housing 28 characteristic of the current device, as discussed above. Additionally and/or alternatively, user inputs (e.g., via the GUI 30) may indicate particular characteristics and/or identities of the housings 28 and/or accessories 29. Further, in some embodiments, the accessories 29 may provide an indication of particular characteristics and/or identities of the accessories 29.

Next, the proper radio frequency system 12 settings are selected and applied to the electronic device (block 126). For example, as mentioned above, the configuration adjustment logic 12 may be polled for settings associated with a particular identity (e.g., model number, etc.) of a housing 28 and/or electronic device 10, an identity of an accessory 29, and/or one or more characteristics of the housing 28 and/or electronic device 10. As previously mentioned, the associated settings may be associated solely with the housing 28, solely with the accessories 29, or with the combination of the housing 28 and the accessories 29. Once the proper settings are returned from the configuration adjustment logic 13, the settings are applied to the radio frequency system 12. Thus, the radio frequency system is ready to communicate (block 128).

It may be desirable to periodically re-adjust the radio frequency system 12 settings. For example, upon detection of an imminent radio frequency communication (e.g., a user of the electronic device 10 activates a payment option on the GUI 30, etc.), a detection of a modification to the housing 28 and/or proximate accessories 29, and/or periodically, the electronic device 10 may re-determine the housings 28 and/or accessories 29 that are present (block 124) and select and apply new radio frequency system 12 settings when housing 28 and/or accessory modifications 29 are detected. For example, in some embodiments, each time a watch band 60 (or other accessory) is interchanged, (e.g., as detected by the electronic device 10), blocks 124-128 may be re-implemented). In some embodiments, these steps may be completed on a periodic basis (e.g., every one hour, two hours, one day, one week, etc.).

Accordingly, the technical effects of the present disclosure include improving performance of a radio frequency system by adjusting operation based at least in part on housings 28 and/or proximate accessories 29 of the electronic device 10. More specifically, upon determination of particular housings 28, accessories 29, and/or combinations of housings 28 and/or 29, radio frequency system 12 settings that are known to produce a sufficient communication experience may be applied to the radio frequency system 12. In this manner, tailored operational parameters may be set, thereby improving efficiency and/or reliability, since the operational parameters may be dynamically adjusted for housings 28 and/or accessories 29 that might impact the radio frequency communications.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a radio frequency system, configured to communicate with a radio frequency reader;
tangible, non-transitory storage, comprising configuration adjustment logic that comprises machine-readable instructions that associate a set of settings for the radio frequency system with at least one housing of an electronic device; and
a processor configured to:
determine an identity of the at least one housing of the electronic device;
receive at least one setting from the set of settings that is associated with the identity of the at least one housing; and
apply the at least one setting to the radio frequency system.

2. The electronic device of claim 1, wherein the processor is configured to:
re-determine the identity of the at least one housing of the electronic device;
re-receive the at least one setting associated with the identity; and
apply the at least one setting.

3. The electronic device of claim 2, wherein the processor is configured to re-determine the identity of the at least one housing upon power up of the electronic device.

4. The electronic device of claim 1, wherein the configuration adjustment logic comprises a lookup table (LUT).

5. The electronic device of claim 1, wherein the set of settings comprise a frame delay time (FDT) setting.

6. The electronic device of claim 1, wherein the electronic device comprises a watch.

7. The electronic device of claim 1, wherein the processor is configured to determine the identity of the at least one housing of the electronic device based upon information that is statically stored in the electronic device's firmware or other storage.

8. An electronic device, comprising:
a radio frequency system, configured to communicate with a radio frequency reader;

tangible, non-transitory storage, comprising configuration adjustment logic that comprises machine-readable instructions that associate a set of settings for the radio frequency system with at least one housing of an electronic device and associate a new set of settings for the radio frequency system with at least one proximate accessory, wherein the at least one proximate accessory comprises an interchangeable protective case, cover, or both; and a processor configured to:
  determine an identity of the at least one housing of the electronic device;
  receive at least one setting from the set of settings that is associated with the identity of the at least one housing;
  apply the at least one setting to the radio frequency system;
  determine an identity of the at least one proximate accessory;
  select the new set of settings that is associated with the identity of the at least one proximate accessory; and
  apply the new set of settings to the radio frequency system.

9. The electronic device of claim 8, wherein the processor is configured to re-determine the identity of the at least one proximate accessory upon determining that the at least one proximate accessory is replaced or removed.

10. The electronic device of claim 8, wherein the processor is configured to re-determine the identity of the at least one proximate accessory at a periodic interval.

11. The electronic device of claim 8, wherein the processor is configured to determine the identity of the at least one proximate accessory of the electronic device based upon a signal provided by the at least one proximate accessory to the electronic device.

12. The electronic device of claim 11, wherein the processor is configured to determine the identity via a manual entry provided via a graphical user interface associated with the electronic device.

13. A radio frequency system, configured to:
  receive a set of settings associated with a housing of an electronic watch associated with the radio frequency system, wherein the housing encloses interior components of the electronic watch, wherein the set of settings are configured to counteract an impact of the housing on communications of the radio frequency system;
  communicate with a radio frequency reader using the set of settings;
  apply a new set of settings associated with a watch band of the electronic watch associated with the radio frequency system, wherein the new set of settings are configured to counteract an impact of a material of the watch band; and
  communicate with a radio frequency reader using the new set of settings.

* * * * *